3,193,360
APPARATUS FOR PROPYLENE POLYMERIZATION
Jack S. Scoggin, Bartlesville, Okla., assignor to Phillips Petroleum Company, a corporation of Delaware
Filed May 31, 1961, Ser. No. 113,681
1 Claim. (Cl. 23—283)

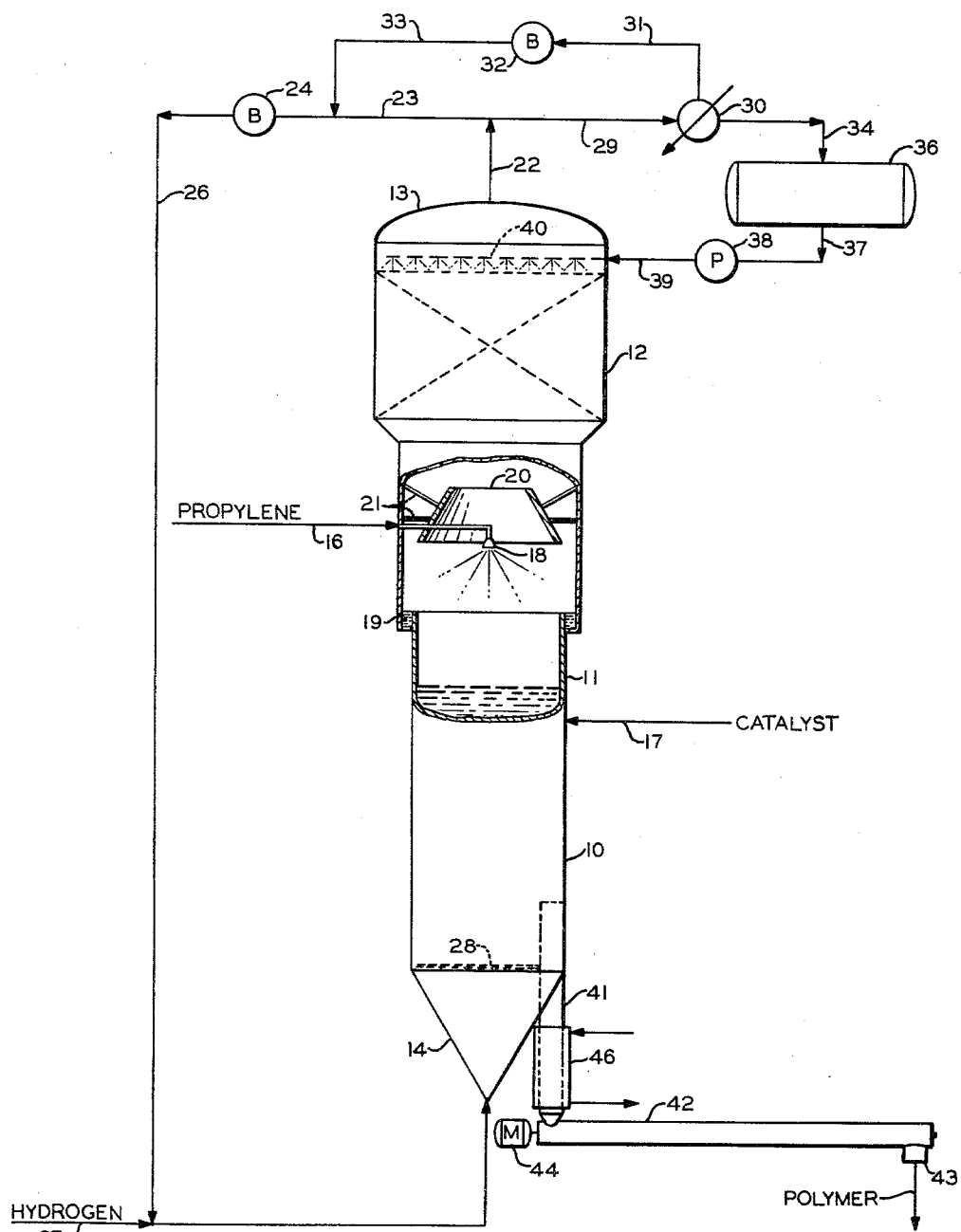
July 6, 1965
J. S. SCOGGIN
3,193,360
APPARATUS FOR PROPYLENE POLYMERIZATION
Filed May 31, 1961
INVENTOR.
J. S. SCOGGIN
BY Hudson & Young
ATTORNEYS United States Patent Office 3,193,360
Patented July 6, 1965

This invention relates to a method and apparatus for polymerizing propylene to solid polymer.

Propylene can be polymerized in the liquid phase in the presence of an organometallic catalyst to form a solid resinous polymer which is useful in the formation of films, filaments and a variety of molded items such as bottles and similar containers. The catalyst used ordinarily includes an organometal of a nontransition metal of Groups I to III of the periodic system; for example, aluminum, beryllium, zinc, magnesium, lithium or sodium having at least one hydrocarbon radical attached thereto and the remaining valences, if any, satisfied by halogen or hydrogen. Complex organometal such as alkylaluminum plus an alkali metal, for example, lithium aluminum tetrapropyl, can sometimes be used. The organometal is used in conjunction with a transition metal compound, preferably a halide of a metal of Groups IV to VI of the periodic system, for example, titanium, vanadium, zirconium, hafmium, thorium, uranium, niobium, tantalum, chromium, molybdenum or tungsten. The chlorides of titanium are preferred. As the commercialization of polypropylene develops, it is essential that improvements and simplification be made in both the polymerization process and the methods of polymer recovery. The field of solid thermoplastics is highly competitive and polypropylene must compete with well established resins such as polyethylene.

Although an inert liquid diluent is normally employed in propylene and other olefin polymerization processes, according to my invention the polymerization is carried out with liquid propylene as the reaction medium. A vertical tower is employed as the reactor and the introduction of propylene vapor into the bottom of the tower eliminates the need for internal agitation by mechanical means. The reaction mixture is cooled by boiling the liquid propylene and the temperature of the process can be controlled by regulating the pressure in the tower. According to my invention, propylene is polymerized by contacting an organometallic catalyst with a body of boiling liquid propylene in a vertically elongated reaction zone, passing propolyene vapor formed by the boiling of said liquid propylene upward through a separation zone in contact with down-flowing liquid propylene while maintaining a flowing film of liquid propylene over the vertical walls of the tower section which encompasses said separation zone. In this manner, polymer accumulations which would normally tend to build up in the vapor space above the reaction mixture are avoided since polymer particles which would otherwise contact and adhere to the tower wall are washed by the flowing film of liquid back into the body of liquid propylene. Propylene vapor is withdrawn from the top of the vapor space and at least a portion thereof is circulated to the bottom of the body of boiling propylene to agitate same. Also, a portion of the vapor which is removed from the body of liquid propylene is condensed and refluxed in contact with the rising vapors. Particulate polymer solids are withdrawn from the bottom of the reaction zone.

The apparatus of my invention is a reactor which comprises, in combination, a closed vertically elongated shell having a lower liquid reaction section, an intermediate vapor section and an upper reflux section, means for introducing liquid into the vapor section against said shell, vapor-liquid contacting means in said reflux section, means for circulating vapor from the top of said reflux section into the bottom of said reaction section, means for refluxing condensed vapor through said vapor-liquid contacting means, and means for withdrawing polymer solids from the bottom of said reaction section.

It is an object of my invention to provide an improved method for the polymerization of propylene to solid polymer. Another object is to provide a simplified reactor for the polymerization of propylene. A further object of my invention is to provide a process for the polymerization of propylene which requires no mechanical agitation within the reaction zone and provides a reaction effluent from which polymer can be readily recovered. Another object is to provide a method of carrying out a propylene polymerization in a tower reactor with boiling liquid propylene as the reaction medium while avoiding the problem of polymer accumulation in the vapor space immediately above the body of boiling propylene. Other objects, advantages and features of my invention will be apparent to those skilled in the art from the following discussion and drawing which illustrates the improved reactor of my invention with a portion of the shell in the separation section being cut away to show the trough, baffle and spray means which in combination with the other features of the tower reduce the tendency of polymer to build up in this separation zone.

While a wide variety of organometallic catalyst systems can be employed for the polymerization of propylene to solid resin, I prefer to use a catalyst which includes the combination of an aluminum alkyl and a titanium halide, preferably a dialkylaluminum chloride or bromide in which the alkyl groups have from one to eight carbon atoms each and titanium chloride. The catalyst system most preferred is diethylaluminum chloride and titanium trichloride. This catalyst can be used very successfully to polymerize propylene to high molecular weight resin at temperatures and pressures which permit liquid propylene to be employed as reaction medium. Generally the weight ratio of the titanium halide to the alkylaluminum is in the range of about 0.5:1 to 20:1. Under the polymerization conditions employed in my process, polypropylene is formed in the reactor in solid particulate form and is removed from the reactor by gravitational settling. A relatively quiescent zone is maintained in communication with the lower portion of the reaction zone so that polymer particles can settle therein and accumulate for removal from the reactor in a high solids concentration. For example, in the reaction suspension, the solids content can be maintianed at about 25 percent while removing an effluent stream of settled polymer solids and liquid propylene having a solids content of 75 percent. These solids can be concentrated further in a compression auger to about 90 percent. The catalyst is removed from the effluent polymer by washing with a suitable solvent such as isopropyl alcohol and the unreacted propylene can be removed in a separate flashing step upstream from the catalyst removal operation or it can be removed in admixture with the catalyst solvent with subsequent separation of these two materials for propylene recovery. If desired, the polypropylene can be further extracted with a suitable solvent such as normal heptane for removal of an atactic polymer fraction. Depending upon the polymerization conditions employed more or less of such atactic polymer is formed and it may be desirable to effect such a removal of amorphous polymer in order to improve the flexural modulus of the finished product.

The details of both the method and apparatus of my invention can best be understood by referring to the drawing. For purposes of clarity, this drawing has been simplified in regard to the feed streams to the reactor and a number of variations in the method of feeding materials to the reactor other than the specific embodiment shown are possible as will be evident from the following discussion. The reactor is made up of three principal sections which are a lower reaction section 10, an intermediate separation section 11, and an upper reflux section 12. The lower reaction section of the reactor which contains the liquid body of boiling propylene is preferably an upright cylindrical shell having a length to diameter ratio in the range of about 3:1 to 10:1. The intermediate separation section defines a vapor space immediately above the reaction section and is preferably a continuation of the shell which forms the reaction section. The separation section ordinarily will have a length to diameter ratio in the range of about 1:1 to 5:1. The upper reflux section positioned immediately above the separation section contains means for contacting the rising vapors with liquid propylene. In the embodiment shown in the drawing, this separation section contains contact packing material such as Raschig rings or Berl saddles. Top closure member 13 closes the top of reflux section 12 while bottom closure member 14 forms the bottom of reaction section 10. Fresh propylene is introduced through conduit 16 and the catalyst is introduced into the body of liquid propylene through conduit 17. Ordinarily the catalyst components are introduced separately; for example, the titanium trichloride can be introduced as a slurry in liquid propylene which forms a part of the feed material and the diethylaluminum chloride can be introduced as a solution in a hydrocarbon such as normal decane. Since a relatively small amount of catalyst is employed on a weight basis, very little of the normal decane solvent is required. In addition to any fresh propylene which is introduced with the catalyst, other fresh propylene can be introduced directly to the liquid body of propylene in the reaction section, as required to maintain the desired liquid level in the reactor.

The polymerization reaction is exothermic and the heat of reaction is removed by vaporizing the propylene from the liquid body. By regulating the pressure within the reactor, taking into consideration the presence of hydrogen, the desired temperature can be maintained. Temperatures within the range of 0 to 190° F. can be employed although the preferred temperature is ordinarily in the range of 60 to 150° F. The pressure within the reactor establishes the desired temperature and can range anywhere from 50 to 760 p.s.i.a., preferably about 130 to 300 p.s.i.a. The amount of catalyst employed can vary substantially but normally about 0.0001 to 0.001 pound of diethylaluminum chloride are used per pound of propylene feed. The ratio of titanium trichloride to diethylaluminum chloride is preferably in the range of about 1:1 to 4.5:1 on a weight basis. Hydrogen can be used in the process to control the melt index of the finished product. Ordinarily, the hydrogen concentration is in the range of about 0.05 to 1 mole percent based on the liquid propylene in the reactor and preferably is not over 0.5 percent. The presence of hydrogen tends to increase the melt index of the polymer.

Vapors leaving the boiling liquid body of propylene, the upper level of which is shown in the cutaway portion of reaction section 10, pass upwardly through separation section 11 and are contacted by droplets of propylene introduced through spray 18 which is fed by conduit 16. Because of the turbulence within the reactor, the rising vapors of propylene tend to carry with them finely divided polymer particles which could cause fouling on the reactor walls. According to our invention, these polymer particles are scrubbed from the rising vapors by the spray of liquid propylene and fouling of the reactor walls is prevented by maintaining a film of downward flowing propylene along the wall sections most likely to be contacted by the polymer particles. This film of liquid propylene can be formed by multiple sprays impinging against the wall of the reactor at the top of the separation section or by some similar liquid distribution means. In the preferred embodiment shown in the drawing, a trough 19 is provided completely encircling the inner wall of the reactor and provision is made to maintain this trough full of liquid propylene and overflowing so that a continuous film of liquid propylene is maintained on the inner wall of separation section 11. The rising vapors passing upwardly through the spray of liquid propylene are directed by baffle 20 into the reflux section wherein they are further contacted with liquid propylene. Liquid propylene falling from reflux section 12 is directed by the outer slope of baffle 20 into trough 19 so that the trough is always maintained overflowing. Baffle 20 is supported within the vapor space of the reactor immediately below the reflux section and above spray 18 by support members 21.

In an alternative embodiment, reflux section 12 contains in place of the packing material a partial condenser through which a cooling medium is circulated in order to condense a portion of the rising vapors by indirect heat exchange. The rising vapors are brought in contact with the condensed liquid in countercurrent flow as the vapors flow through the partial condenser. The contact between the liquid propylene and the vapors serves to remove any polymer which has escaped separation from the rising vapors in the separation section.

Propylene vapor is removed overhead from the top of reflux section 12 through conduit 22 and is passed through conduit 23, blower 24 and then through conduit 26 to the bottom of reaction section 10. Makeup hydrogen which is added as required can be introduced to conduit 26 with the recycle propylene vapor through conduit 27. Additional fresh propylene can also be added in the form of vapor to provide the desired agitation in the body of liquid propylene in reaction section 10. Dispersion plate 28 is disposed transversely in the bottom of reaction section 10 above the inlet of the propylene vapor entering by way of conduit 26. This dispersion plate diffuses the incoming propylene vapor and distributes it throughout the cross section of the reactor so that full agitation in all parts of the vessel is obtained. The amount of vapor circulated in this manner depends upon the number of factors, such as the desired agitation within the reaction section, the amount of vapor which is removed from the reflux section which in turn depends upon the amount of vaporization required in boiling the liquid propylene to obtain the desired reaction temperature, and the amount of reflux condensate required to cool the reaction mixture.

As shown in the drawing, the vapor in conduit 22 which is not recirculated to the bottom of the reactor is passed by way of conduit 29 to partial condenser 30. Since hydrogen is present in the vapors, it cannot be expected that all of the vapor introduced to condenser 30 is condensed so that provision is made for venting the condenser by way of conduit 31, and blower 32 returns the vented gases by way of conduit 33 to conduit 23 which feeds into blower 24 and recirculating conduit 26. Condensate from condenser 30 passes by way of conduit 34 to receiver 36 and then through conduit 37, pump 38 and conduit 39 to distributor ring 40 disposed in the top of reflux section 12 above the packing material. Depending upon the temperature at which the reactor is operated, a refrigerant may have to be used as the cooling media in heat exchanger 30. Ordinarily it is desirable to keep the temperature of the reflux propylene about 10 to 30° cooler than the desired temperature in the reactor.

As the polymerization proceeds, the solid polymer formed tends to settle into settling leg 41 in which is maintained a relatively quiescent zone to encourage polymer settling at a rate of about 0.1 to 3 feet per minute, and an effluent containing a major amount of polymer solids is withdrawn from the bottom of settling leg 41 and passed into the inlet of compression auger 42. Compression auger 42 is constructed so as to provide a restriction to the flow of polymer at its discharge end thereby building up a compacted mass of polymer. Liquid propylene is expressed from the mass and forced back through the polymer and into settling leg 41. Effluent can thus be removed from the discharge outlet 43 of compression auger 42 containing only about 10 percent liquid. Fresh propylene can be introduced into auger 42 at an intermediate point thereof and/or at a lower point of settling leg 41 to pass countercurrently to the polymer in the settling leg and in the auger, thereby washing catalyst back into the reactor. The screw of compression auger 42 is powered by motor 44. Settling leg 41 should be disposed toward one side of the reactor and preferably is adjacent the shell of reactor section 10. The length of the settling leg should be sufficient to provide a quiescent zone which is not affected substantially by the turbulence within the reactor. Generally, a settling leg having a length to diameter ratio in the range of about 3:1 to 10:1 and preferably about 5:1 to 8:1 provides the required settling rate. The settling leg should be cooled by circulating a coolant through jacket 46 in order to prevent boiling of the propylene in the settling leg.

In order to illustrate further the method of my invention, the following example is presented. The conditions and proportions presented in the example are meant to be typical only and should not be construed to limit my invention unduly. Liquid propylene is contacted with a catalyst of diethylaluminum chloride and titanium trichloride in a vertically elongated reaction zone 8 feet in diameter and 40 feet in length at a temperature of 100° F. and a pressure of 250 p.s.i.a. Fresh propylene is introduced as a spray in the vapor space above the boiling liquid propylene and a continuous film of liquid propylene is maintained flowing downwardly over the inner walls of the reaction column in this vapor space. Vapor rising from the boiling liquid propylene is passed in contact with the spray of incoming liquid propylene and then upwardly through a 10 foot section of the reaction tower containing 1½ inch Berl saddles. Propylene vapors are withdrawn overhead and a portion is recirculated to the bottom of the reaction zone and the remainder is passed through a condenser wherein the propylene is condensed and the condensate returned to the reflux section of the reactor and distributed over the top of the packing. The polymer solids are withdrawn continuously from the bottom of the reactor through the settling leg and compression auger. The temperature of the propylene condensate in receiving vessel 36 is 80° F. and the pressure in said vessel is 235 p.s.i.a. Cooling water at 60° F. is circulated through a jacket surrounding the settling leg so that the temperature therein is maintained at 80° F., thereby eliminating any vaporization of propylene in the settling leg and maintaining the lower portion thereof in a quiescent state. The polymer solids withdrawn from the compression auger are washed with isopropyl alcohol for removal of catalyst and then dried by contact with an inert gas. The flow of materials is shown in the material balance in the following table with reference to the stream flows as indicated in the accompanying drawing.

*Material balance (lbs. per hour)*

|  | Propylene Feed (16) | Fresh Catalyst (17) | Hydrogen Makeup (27) | Overhead Vapor (22) | Recirculated Vapor (26) | Vent Gas (31) | Reactor Reflux (37) | Reactor Effluent (43) |
|---|---|---|---|---|---|---|---|---|
| Propylene | 4,300 |  |  | 98,076 | 62,618 | 608 | 35,458 | 390 |
| Propane | 43 |  |  | 10,898 | 6,958 | 68 | 3,943 | 43 |
| Diethylaluminum Chloride |  | 1.3 |  |  |  |  |  | 1.3 |
| Titanium Trichloride |  | 5.6 |  |  |  |  |  | 5.6 |
| Hydrogen |  |  | 0.05 | 58 | 48 | 11 | 10 | 0.05 |
| N-Decane |  | 2 |  |  |  |  |  | 2 |
| Polypropylene |  |  |  |  |  |  |  | 3,714 |
| Soluble Polymer |  |  |  |  |  |  |  | 196 |

As will be apparent to those skilled in the art, various modifications can be made in my invention without departing from the spirit or scope thereof.

I claim:

A reactor suitable for propylene polymerization comprising, in combination, an upright cylindrical shell having a lower reaction section with a length to diameter ratio in the range of about 3:1 to 10:1, an intermediate separation section with a length to diameter ratio in the range of about 1:1 to 5:1, and an upper reflux section, top and bottom closure members confining the volume within said shell, a circular trough disposed in said separation section adjacent said shell so that liquid overflowing from said trough is distributed against the inner wall of said shell in said separation section, vapor-liquid contact packing material positioned in said reflux section, means for circulating vapor from the top of said reflux section to an inlet in the bottom of said reaction section, a dispersion plate positioned transversely in the bottom of said reaction section above the vapor inlet, means for condensing vapor withdrawn from the top of said reflux section and distributing the resulting condensate over said packing, baffle means positioned below said packing and above said trough to direct a portion of liquid flowing from said packing into said trough, a spray for liquid feed disposed in said separation section, a catalyst settling leg vertically disposed adjacent said shell and at the bottom of said reaction section, said settling leg having a length to diameter ratio in the range of about 3:1 to 10:1, and a compression auger connected at its inlet end to the lower end of said settling leg.

References Cited by the Examiner

UNITED STATES PATENTS

| 2,085,524 | 6/37 | Simo | 260—94.9 |
| 2,484,384 | 10/49 | Levin et al. | 260—683.15 |
| 2,755,324 | 7/56 | Mueller | 260—683.15 |
| 2,885,389 | 5/59 | Schappert | 260—94.9 |
| 2,904,409 | 9/59 | Bolstod | 23—285 |
| 3,002,961 | 10/61 | Kirschner | 260—93.7 |
| 3,023,203 | 2/62 | Dye | 260—94.94 |
| 3,126,365 | 3/64 | Hooker | 260—94.92 |

JOSEPH L. SCHOFER, *Primary Examiner.*

MILTON D. LIEBERMAN, WILLIAM H. SHORT,
*Examiners.*